F. N. CRONHOLM.
SPOON GAGE.
APPLICATION FILED FEB. 24, 1910.
969,845.
Patented Sept. 13, 1910.
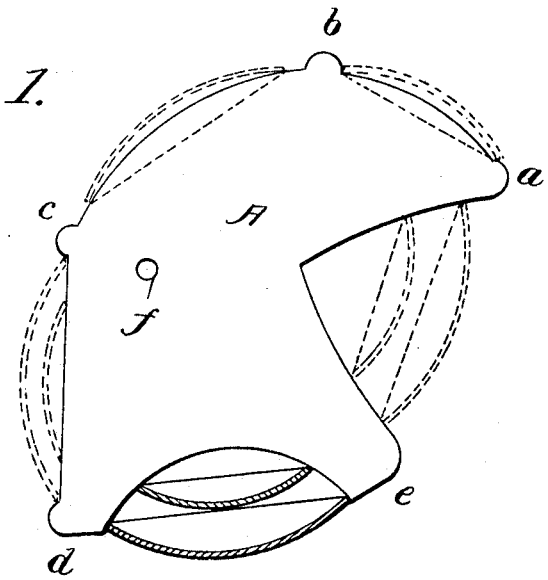
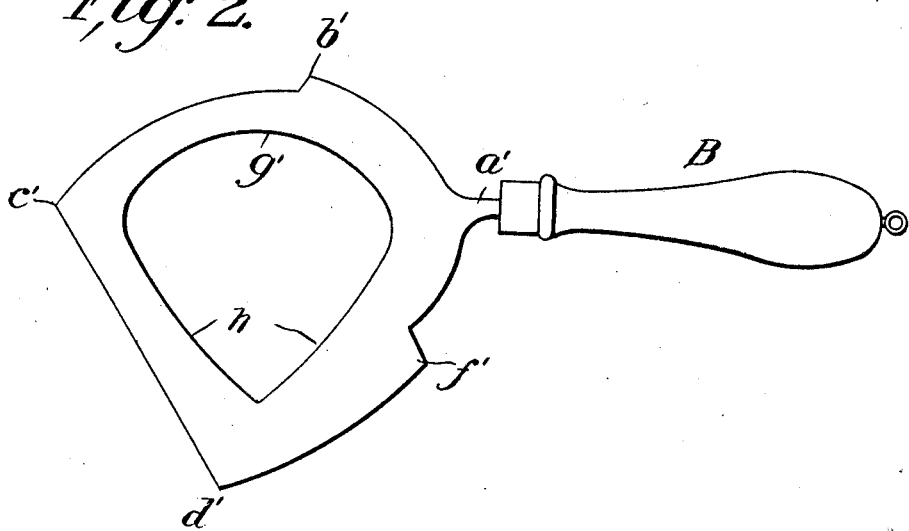

UNITED STATES PATENT OFFICE.

FREDERICK N. CRONHOLM, OF NACHES, WASHINGTON.

SPOON-GAGE.

969,845.  Specification of Letters Patent.  Patented Sept. 13, 1910.

Application filed February 24, 1910. Serial No. 545,619.

*To all whom it may concern:*

Be it known that I, FREDERICK N. CRONHOLM, a citizen of the United States of America, and a resident of Naches, county of Yakima, State of Washington, have invented certain new and useful Improvements in Spoon-Gages, of which the following is a full and clear specification, reference being had to the accompanying drawing, in which is represented a plan view of my device, the manner of using the various portions of its edges being shown by dotted lines, these dotted lines representing cross-sections of different sizes of spoons.

Culinary recipes usually indicate the amount of such substances as soda, baking-powder, salt, pepper, sugar, etc., by spoon-measure, that is, by prescribing a heaping or rounding or full or half-spoonful. In attempting to measure off these quantities with the ordinary tea-spoon or table-spoon alone it, as is well known, is practically impossible to get the exact amount of material that is called for by the recipe, thus rendering it practically impossible for different cooks to get the same results in following any given recipe and even preventing the same person from getting the same results in following the same recipe at different times.

It is the object of my invention to provide a simple device which will enable the user to readily measure off any one of these quantities with sufficient accuracy to get the same results every time the same recipe is followed.

My device consists of a single plate A of thin sheet metal of irregular outline, the edges of this plate being divided into facets or divisions each of which is adapted to be used in connection with a spoon of the ordinary construction to measure off any one of the above-referred-to quantities. The facets or divisions are separated from each other by a series of lugs *a*, *b*, *c*, *d* and *e*. The edge of the plate between lugs *a*, and *b* is curved outwardly or convexed as is likewise the edge between lugs *b* and *c*, the curve of the former being on a shorter radius than the curve of the latter so that the former is adapted for use with a tea-spoon and the latter with a table-spoon or other large spoon. These two divisions of the plate are adapted to measure off half-spoonfuls and the method of using the plate for this purpose is indicated by the dotted lines, that is, a spoon is filled with the granular or powdered article to be measured then the convexed edge is placed across the spoon-bowl and moved the full length of the bowl, the curved edge of the plate touching only the edges of the spoon-bowl and thus scraping off all the material but a half-spoonful.

The division between the lugs *c* and *d* has its edge straight, thus adapting it to measure of a spoonful whether the spoon be a small one or a large one. The division between the lugs *d* and *e* curves inwardly and thus adapts this edge or facet to measure off a rounded spoonful, the curve of this section being deep enough to receive spoons of various sizes. The remaining one of the divisions also has its edge extending into the body of the plate toward the center thereof, this inwardly cut portion being approximately V-shaped with the sides of the V sligthly concave, thus adapting this section of the plate to gage a heaping teaspoonful. This section of the edge is also adapted to coöperate with spoons of different sizes, it being obvious that all the sections except the convex sections are adapted for spoons of different sizes. It will be observed that the plate may be provided with a hole *f* for hanging it up on a nail or hook.

It will be observed that the invention is not confined to the form of device shown in Figure 1. In Fig. 2 is shown one other embodiment of the invention. In this device the plate is provided with a handle B and the separating shoulders are indicated by the letters *a'*, *b'*, *c'*, *d'* and *f'*, the latter two shoulders separating two convex facets which are adapted to measure off three-quarters of a teaspoonful and three-quarters of a tablespoonful respectively. In this modification the concave facets which are adapted to measure off respectively a heaping teaspoonful and a rounded teaspoonful are shown cut out of the middle of the plate, as shown at *g'* and *h* respectively.

It will be obvious that still other modifications of the device are within the spirit of the invention.

Having thus fully described my invention, what I claim as new, and desire to secure by Letters Patent, is—

1. A device of the class set forth comprising a plate cut away at one point to form a deep concave gage-portion and at another point to form a relatively shallow concave gage-portion whereby said concave gage-portions are adapted to measure, respectively, heaping and rounded spoonfuls with spoons of various sizes, said plate also having a plurality of convex gage-portions of different curvature formed on its edge for measuring fractional spoonfuls with spoons of various sizes.

2. A device of the class set forth comprising a plate whose outer edge is divided by means of projections into a series of divisions, the edge of one of said divisions being cut away to form a deep concave gage-portion and the edge of another of said divisions being cut away to form a relatively shallow concave gage-portion so that said concave gage-portions are adapted to measure, respectively, heaping and rounded spoonfuls with spoons of various sizes, and the edges of the other divisions being shaped to form convex gage-portions of different curvature to measure fractional spoonfuls.

3. A device of the class set forth comprising a plate whose outer edge is cut away at one point to form a deep concave gage-portion and at another point to form a relatively shallow concave gage-portion whereby said concave gage-portions are adapted to measure, respectively, heaping and rounded spoonfuls with spoons of various sizes, said plate also having a plurality of convex gage-portions formed on its edge each of which has a different curvature whereby each convex gage-portion is adapted for use with a spoon of a different size to measure a uniform fraction of a spoonful, and a straight edge portion adapted for use with spoons of various sizes to measure level spoonfuls.

In testimony whereof I hereunto affix my signature in the presence of two witnesses this 11th day of Feb. 1910.

FREDERICK N. CRONHOLM.

Witnesses:
G. C. Cate,
W. B. Cate.